United States Patent [19]
Kowalski

[11] Patent Number: 5,420,412
[45] Date of Patent: May 30, 1995

[54] PC-CARD HAVING SEVERAL COMMUNICATION PROTOCOLS

[75] Inventor: Jacek Kowalski, Trets, France

[73] Assignee: Gemplus Card International, Gemenos, France

[21] Appl. No.: 8,517

[22] Filed: Jan. 25, 1993

[30] Foreign Application Priority Data

Jan. 30, 1992 [FR] France .................. 92 01001

[51] Int. Cl.⁶ .............................. G06K 19/06
[52] U.S. Cl. .................. 235/492; 395/275
[58] Field of Search .......... 235/492, 379, 380; 395/275; 370/79, 85.13

[56] References Cited

U.S. PATENT DOCUMENTS

| | | | |
|---|---|---|---|
| 4,653,047 | 3/1987 | Vij et al. ................. | 370/67 |
| 4,677,611 | 6/1987 | Yanosy, Jr. et al. ........ | 370/85.13 |
| 4,758,718 | 7/1988 | Fujisaki et al. ........... | 235/492 X |
| 4,807,282 | 2/1989 | Kazan et al. .............. | 370/284 |
| 4,878,058 | 10/1989 | Needles ................... | 341/101 |
| 4,979,169 | 12/1990 | Almond et al. ............. | 370/79 X |
| 5,239,542 | 8/1993 | Breidenstein et al. ....... | 370/79 |

FOREIGN PATENT DOCUMENTS

| | | |
|---|---|---|
| 62130040 | 6/1987 | Japan . |
| 62281642 | 12/1987 | Japan . |
| 63250726 | 10/1988 | Japan . |
| 1117550 | 5/1989 | Japan ............ 370/85.13 |
| 4321189 | 11/1992 | Japan . |
| 4321191 | 11/1992 | Japan . |
| 512499 | 1/1993 | Japan . |

OTHER PUBLICATIONS

IBM Technical Disclosure Bulletin vol. 27, No. 10B Mar. 1985.

Primary Examiner—Donald Hajec
Assistant Examiner—Jeffrey R. Filipek
Attorney, Agent, or Firm—Roland Plottel

[57] ABSTRACT

The invention relates to PC-cards.

In order to permit communications between readers operating according to several different communication protocols, according to the invention said card comprises:

several conversion circuits (CNV1, CNV2, CNV3), each of which is able to convert into instructions performable by the card the electrical signals received from the reader according to a given protocol, each of the different conversion circuits corresponding to a different communication protocol, and a protocol selection circuit (CNVA, L0, L1, L2, L3, G1 to G6), incorporating an auxiliary conversion circuit (CNVA), the latter being able to produce specific instructions performable by the card, said specific instructions being used for the selection of one of the conversion circuits and being produced from electrical signals which can be produced in all the protocols.

5 Claims, 3 Drawing Sheets

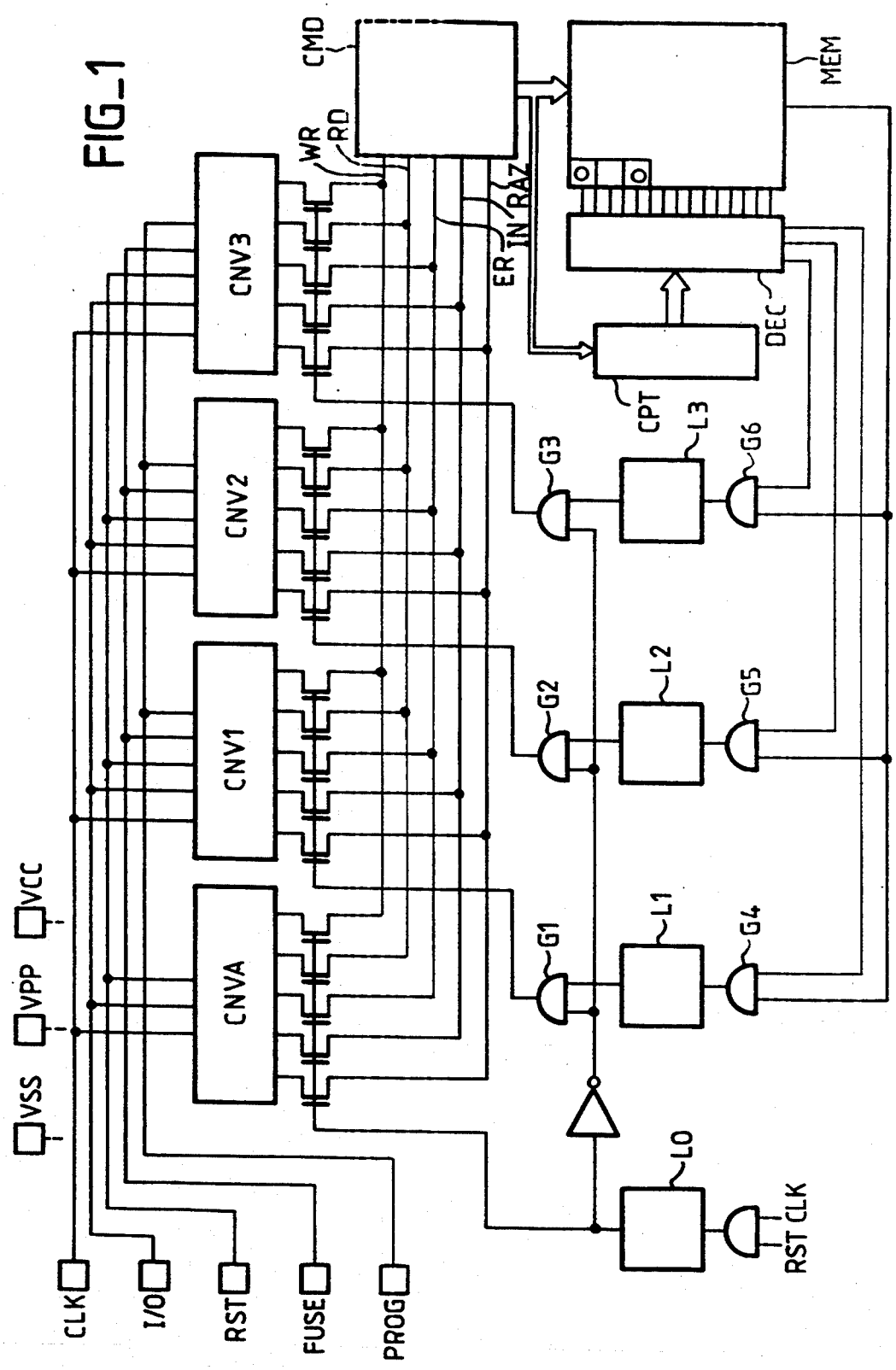
FIG_1

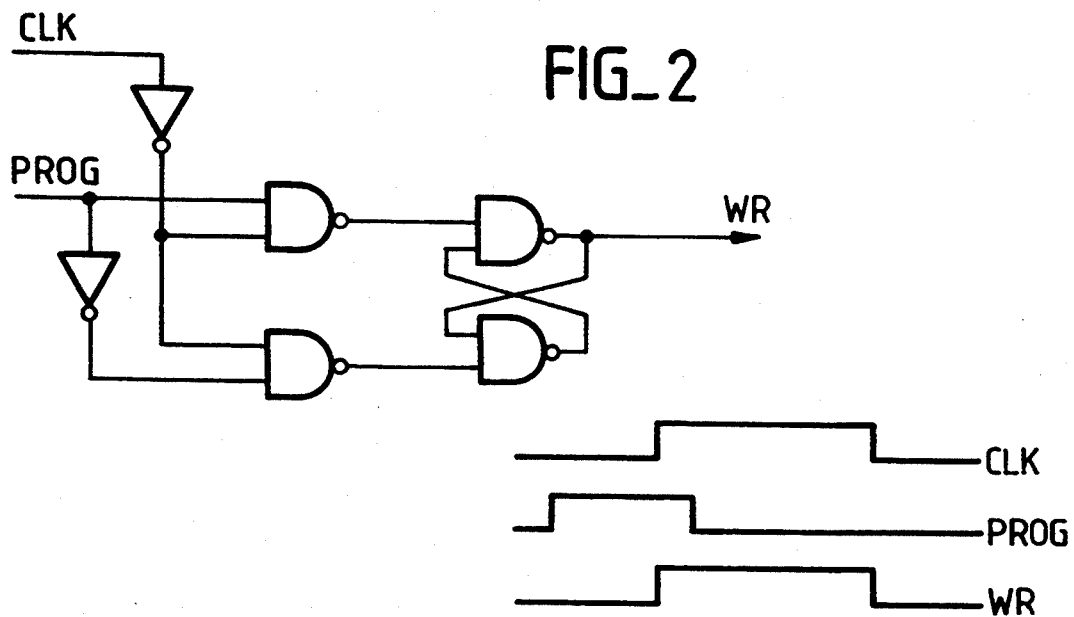
FIG_2
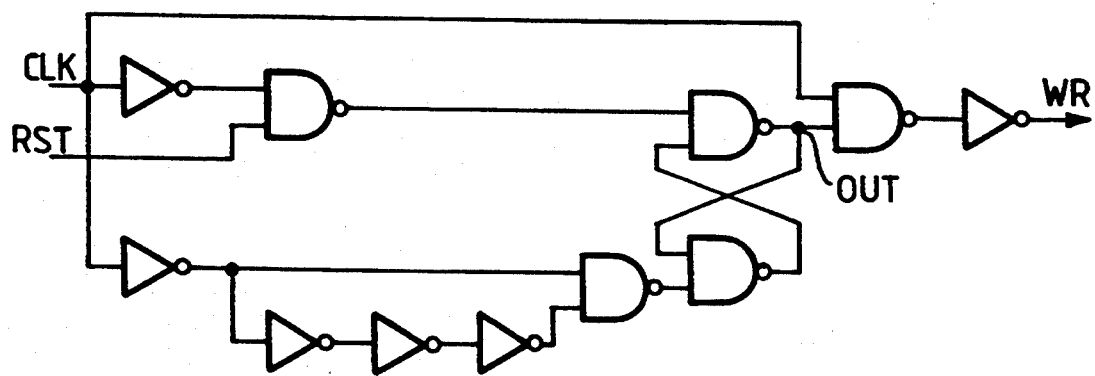
FIG_3

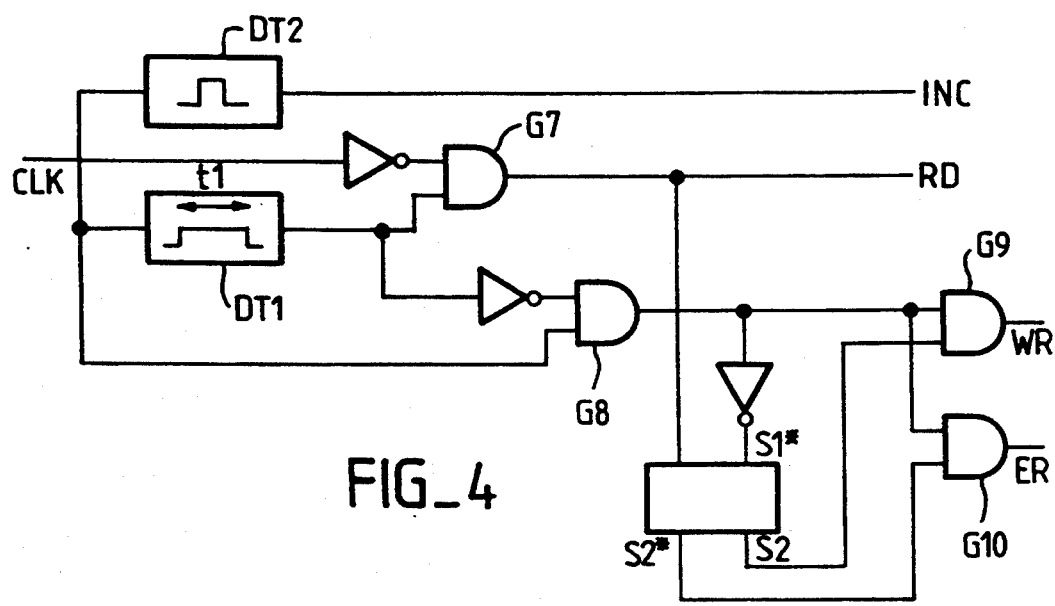
FIG_4
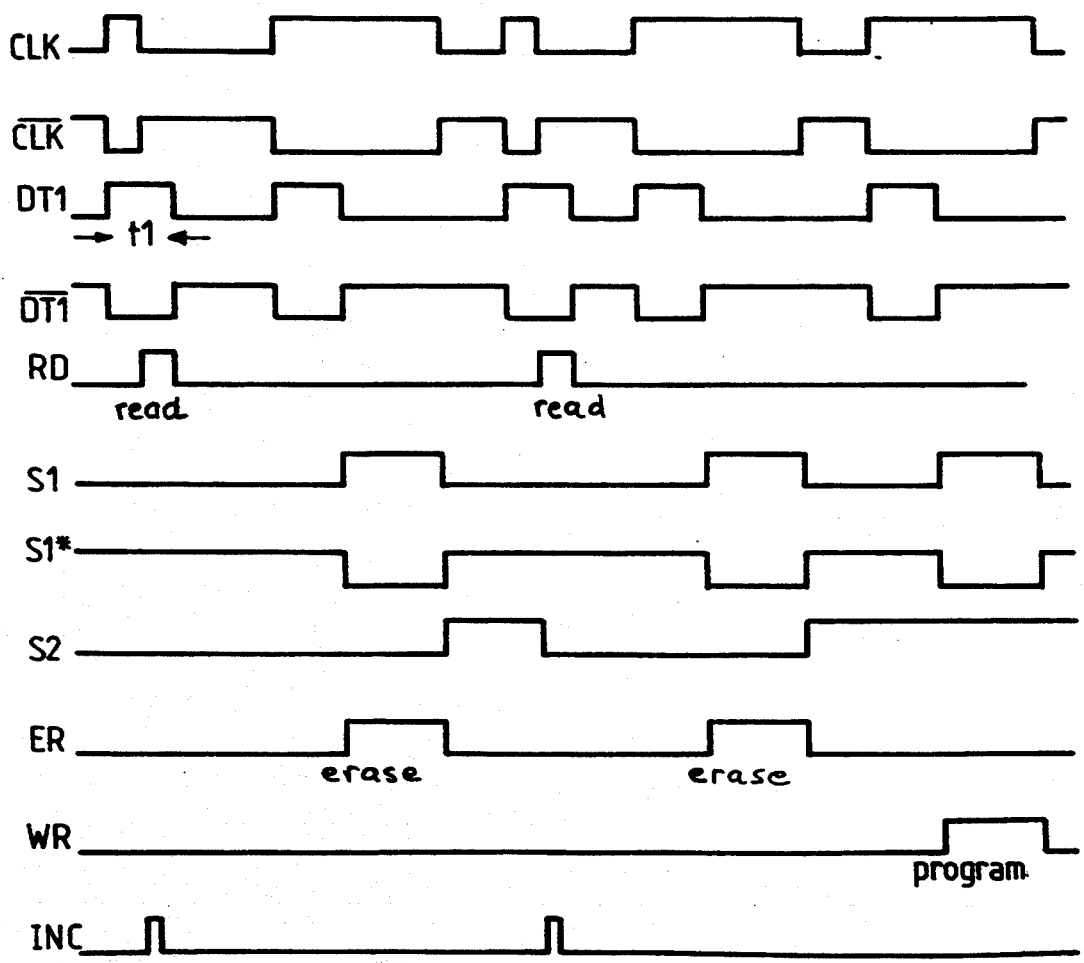
FIG_5

PC-CARD HAVING SEVERAL COMMUNICATION PROTOCOLS

BACKGROUND OF THE INVENTION

The present invention relates to PC-cards and in particular those used for obtaining goods or services. The standard example is that of the prepaid telephone card making it possible to make telephone calls from public call boxes without having to use coins or tokens.

To facilitate the description of the present invention reference will solely be made to telephone cards, bat the invention is also usable in much wider applications of very varying types such as bank cards and the like.

A problem which is ever more frequently encountered is the compatibility between the PC-cards issued by a first service provider and those issued by another service provider, even when the services supplied are very similar.

The case of the telephone card is a perfect example of this problem. A card issued by the telecommunications bodies of one country are physically very similar, i.e. with the same standard dimensions, to those issued by another country. The position of the electrical contacts on the card and the number of such contacts are also fixed by the same international standard. This means that a card issued in one country can be physically inserted into a reader corresponding to the system of another country. However, it will still not operate, because the communication protocols between the card and the reader do not correspond, so that the reader emits signals in accordance with a protocol which the card does not understand.

The term "protocol" is intended to cover beth the time organization of electrical signals passing between the card and the reader and their spatial organization, i.e. their presence on a particular physical contact of the card or reader.

In numerous cases, it would e.g. be preferable for a French card holder to be able to use his card in Germany should the need arise, despite the protocol difference between the readers of the two countries.

To provide a more complete illustration of this problem, reference can be made to the standards which define the protocols for different systems using conventional PC-cards with eight contacts and a synchronous and sequential communication mode. In France the standard used is called TS1001, in Germany SLE4403, whilst other countries use standard TS1001 or SLE4403 or TS1301. These are standards corresponding to synchronous operations of the card, i.e. controlled by a clock based on the card reader. The operations to be carried out are extremely simple: reinitialization; reading a data item at the current address; incrementation by one address position; programming or erasing at the current address, etc.

If the eight contacts of the card are called VCC, VSS, VPP, CLK, I/O, RST, FUSE and PROG, it can be seen that the first five symbols are the same for all these standards and respectively correspond to:
VCC: positive supply voltage 5 V
VSS: earth/ground
VPP: programming voltage (approx. 15 V)
CLK: clock
I/O: data input/output.

However, the three other contacts have different meanings according to the different standards.

In standard TS1001, the FUSE contact is a general activation contact. If it is at zero, a resetting operation is performed and it must be at 1 for the operations of reading, address incrementing or programing in the card. The contact RST defines whether it is an incrementation operation (RST=0) or programming operation (RST=1) on the rising front of the clock CLK. Reading takes place in all cases on the falling front of the clock CLK.

In standard TS1301, it is the signal RST which defines the activation (RST=1) or the reinitialization (RST=0), the contact PROG defining whether or not there is programming. Reading takes place on the falling front of the clock CLK and address incrementation on the rising front of the clock CLK.

Finally, in standard SLE4403, the contact RST fulfills a double function, namely reinitialization if it lasts sufficiently long and programming on the rising front of the clock CLK if there has previously been a short positive pulse on RST and address incrementation in the absence of such a short prior pulse on RST. In all cases reading takes place on the falling front of the clock CLK.

This makes it clear that it is impossible to make a card operate in a reader, which applies to it signals which are different from what it can understand.

It could be imagined that the reader would be able to communicate with several types of cards and its operation is adapted to the card which is inserted. However, in practice, the physical processing of the signals produced by the reader and intended for the card takes place in a fixed manner, either in hardware (i.e. cables logic) or in firmware, i.e. under the control of a ROM. It would therefore be necessary to change or modify the readers and not merely their operating software if the readers would have to be made adaptable to several card types. Moreover, even if the card reader has several different protocol circuits, the user would have to indicate which type of card he was going to insert.

SUMMARY OF THE INVENTION

According to the invention, in order to be able to insert cards in readers operating according to different communication protocols, it is proposed that in the card there are:
several conversion circuits, each of which is able to convert into instructions performable by the card the electrical signals received from the reader according to a given protocol, each of the different conversion circuits corresponding to a different communication protocol,
and a protocol selection circuit, incorporating an auxiliary conversion circuit, the latter being able to produce specific instructions performable by the card, said specific instructions being used for the selection of one of the conversion circuits and being produced from electrical signals which can be produced in all the protocols.

In practice, the invention consists of essentially using those card contacts which have identical or very similar meanings in all the protocols in order to make a prior selection of the protocol which will be subsequently used in practice. Then use is made of the appropriate conversion circuit according to which the communication takes place with the chosen protocol.

The reader communicates with the card during the initial protocol selection phase temporarily using a simplified protocol performable by all reader types, no matter what their normal exchange protocol.

Preferably it is ensured that said simplified protocol is mainly constituted by a part common to all possible protocols, so that the reader can communicate simply using its own protocol, no matter what this is. This makes it unnecessary for the reader to have to use two successive protocols, i.e. firstly a simplified protocol and then a complete protocol and this in particular makes it possible to use the readers of different types which have already been installed.

During the initial phase, the card then interprets the protocol of the reader as a special protocol, which makes it possible to perform all the operations necessary for the selection of a future exchange protocol. It is the auxiliary conversion circuit which carries out this interpretation of the signals received from the reader during the initial phase.

Specifically, in the example of the cards having eight contacts referred to hereinbefore with five common contacts (VCC, VSS, VPP, CLK, I/O), use will essentially be made of the clock contact (CLK) for producing the selection instructions. The contact RST will be used for confirming the selection made. The data input/output contact (I/O) will be used for reading operations. The supply terminals are also used because they are common to the different protocols. However, in principle, the terminals PROG and FUSE will not be used.

Preferably, in a simple PC-card application in which the instructions performable by the card relate to the memory and are five in number (initialization, reading, address incrementation, programming, erasing), use is made of part of the card memory for storing a bit representing the protocol which is to be used. Thus, use is made of a simplified protocol for entering in said memory the bit identifying the protocol to be used.

Preferably, if a clock contact is one of the common contacts to the different protocols, according to the invention for the protocol selection phase specific instructions will be performed, whose meaning will be modified as a function of the duration of a clock square wave pulse appearing on said contact. In this case, it is particularly desirable to ensure that programming or erasing instructions in a memory correspond to a long square wave pulse time and reading instructions correspond to a short square wave pulse time.

The auxiliary conversion circuit is then able to receive the clock signals from the reader and is also connected to the reader by a data input-output. It preferably at least supplies the following instructions: erasing the state of a bit in the presence of a long clock signal; programming said bit in the presence of a second long clock signal immediately following the first without interposing a short clock signal between them; and incrementing by one address bit the memory activated by the rising front of a short clock signal.

The following specific supplementary instruction can then be performed: reading of the state of a bit and transmission on the data input-output contact activated by the falling front of a short clock signal.

BRIEF DESCRIPTION OF THE DRAWINGS

The invention is described in greater detail hereinafter relative to non-limitative embodiments and with reference to the attached drawings, wherein show:

FIG. 1 The general circuit diagram illustrating the performance of the invention.

FIGS. 2 & 3 In exemplified manner portions of the conversion circuit of the diagram of FIG. 1 with the corresponding timing charts.

FIG. 4 An embodiment of the auxiliary conversion circuit according to the invention.

FIG. 5 The timing charts corresponding to the diagram of FIG. 4.

DETAILED DESCRIPTION OF THE INVENTION

FIG. 1 is the circuit diagram making it possible to perform the present invention in the example of a PC-card (such as a prepaid telephone card). FIG. 1 more specifically shows the circuits incorporated into the PC-card and enabling the latter to be inserted in readers operating according to different protocols.

In a conventional PC-card chip the following elements would be present:

external access contacts connecting the chip to the reader, there being eight such contacts here which are designated VCC, VPP, VSS, CLK, I/O, RST, FUSE, PROG;

a memory MEM, e.g. an EEPROM (electrically erasable programmable read only memory). This memory is sequentially addressable in the most widely used case, i.e. a unit-incremented address counter CPT controls an address decoder DEC in order to successively designate the different memory words;

logic control circuits for the memory, generally designated CMD, which make it possible to establish on the rows and columns of the memory cells the voltages suitable for performing the various operations necessary for the function of a memory; in this case there are e.g. five such operations: reading the content of a cell at a given address, programming a cell at said address, erasing said cell; incrementation of the address to pass to a following cell; reinitialization of the address counter CPT, which defines the current address—said circuits CMD will not be described here because they are of a conventional nature and are dependent on the memory type used;

a conversion circuit able to receive the signals emitted by the PC-card reader on the card contacts and able to transform then into instructions intended for the control circuit CMD in order to make the latter perform the operations indicated hereinbefore as a function of the instruction received; the conversion circuit directly receiving the signals from the reader and establishes the orders necessary as a function of the spatial and time organization of said signals and these orders are transmitted to the control circuit CMD.

According to the invention, on the chip there are the sane access contacts, the memory MEM, the same control circuit CMD, but there are several different conversion circuits CNV1, CNV2 and CNV3, each fulfilling the function of the prior art conversion circuit, but each for a different protocol. In addition, on the chip there is a protocol selection circuit able to select a particular conversion circuit and connect it to the control circuit CMD.

The protocol selection circuit is intended to carry out this selection on the basis of an order received from the reader. Thus, the reader will start a dialogue with the PC-card by indicating to it the protocol with which it functions, so that the card adapts to said protocol. The difficulty is that the card must be able to understand the instructions from the reader, whilst still not knowing which is the protocol.

Thus, according to a feature of the invention, the protocol selection circuit mainly has an auxiliary conversion circuit CNVA able to temporarily communicate with the reader according to a concise dialogue mode making it possible to determine the protocol to be used subsequently in order to continue the data exchange. The auxiliary conversion circuit has the special feature of essentially reacting as a function of signals, which can be very easily produced in all protocols liable to be used.

In the present case, the auxiliary conversion circuit CNVA receives the supply voltages present on the terminals VPP, VCC, VSS and also receives the clock signals from the reader appearing on the terminal CLK. It receives the signal present on the terminal RSF. Finally, it is connected to the input/output terminal I/O, mainly for transmitting information to the reader. In the example described here, it is considered that these five contacts or terminals receive signals of the same nature in all the protocols and make it possible to temporarily establish a simplified protocol which is only used during the protocol selection phase.

Thus, the auxiliary conversion circuit will establish a small number of checking or control signals intended for the control circuit CMD, but only during an initial phase during the introduction of the card into the reader. Several practical possibilities exist. In a first possibility, the protocol selection circuit can designate the protocol to be used during the operation taking place and without permanently recording in the card a protocol identification to be used in the future. This would be the simplest solution.

However, preference is given to a solution in which the protocol identification to be used is recorded in non-volatile manner in the card and remains for as long as the card is not introduced into a reader having a different protocol. When the card is introduced into a reader of a different type, the information relative to the protocol is modified in a non-volatile manner. This is the case described in greater detail hereinafter.

Preferably, according to the invention and in the case of a PC-card, the first addresses of the memory are used for recording a word representing the protocol to be used.

In a simple illustrative example, it will be considered that each of the memory words comprises a bit and that the successive addresses of the memory designate successive binary cells. The first three cells of the memory are used for designating the protocol to be used. For example, if protocol 1 is to be used, a bit 1 has to be stored in the first address, the other two being at zero. If it is the second protocol which is to be used, a bit 1 will be entered in the second cell and the two others are at zero. Finally, if it is the third protocol, the bit of the third address must become 1 and the first and second are at zero.

The state of the three first memory cells is used for defining the state of three bistable flip-flops L1, L2, L3, each of which controls the putting into or out of operation of a respective conversion circuit CNV1, CNV2, CNV3. In normal operation, only one of these three flip-flops is in a state putting a conversion circuit into operation and only one protocol can operate at once. Moreover, a supplementary bistable flip-flop L0 makes it possible to put out of service the three conversion circuits CNV1, CNV2, CNV3, whilst putting into service the auxiliary conversion circuit CNVA.

The control of the conversion circuits by the flip-flops is represented symbolically in the drawing by transistors, which are controlled by a flip-flop and which connect the outputs of a respective conversion circuit to the control circuit CMD. The prevention of putting into service of the conversion circuits CNV1, CNV2, CNV3 by the flip-flop L0 is symbolized by the logic AND gates G1 to G3, each placed between a flip-flop L1 to L3 and a respective conversion circuit CNV1 to CNV3. These AND gates all have an input controlled by the flip-flop L0 and an input connected to the output of a flip-flop L1 to L3.

The positioning of the flip-flops L1 to L3 as a function of the content of the memory MEM takes place by means of the gates G4 to G6 making it possible to transmit to each flip-flop the state of a respective bit from among the first three bits of the memory. These gates are opened by output lines of the decoder DEC (corresponding to the first three memory positions). They allow the passage to the flip-flops of the state read on an output line of the memory.

The auxiliary conversion circuit CNVA, the flip-flops L0 to L3 and the logic gates associated therewith together form the protocol selection circuit. The procedure for putting into service a particular conversion circuit takes place in the following way. On making the chip live, there is a zero initialization of the address counter CPT, which then makes it possible to designate the first memory cell by means of the decoder DEC. In parallel, at the time of activation or rendering live, the bistable flip-flop L0 is placed in a state where it puts into service the auxiliary conversion circuit CNVA or places out of service all the other conversion circuits. The following operations are then performed under the control of the auxiliary conversion circuit CNVA.

The first three memory bits are read by a succession of reading operations followed on each occasion by an incrementation of the address counter. During the reading stages, the flip-flops L1, L2, L3 assume the state corresponding to the bit stored in the respective memory cell corresponding thereto (the flip-flop L1 assuming the state of the first cell, flip-flop L2 that of the second cell, etc.).

Only one of the flip-flops will consequently be placed in a state authorizing the putting into service of one of the conversion circuits, e.g. flip-flop L2 authorizes the putting into service of the circuit CNV2.

If this corresponds to the desired protocol, i.e. that of the reader, the reader supplies a signal which switches the flip-flop L0 inhibiting the operation of the auxiliary conversion circuit CNVA and putting into service the conversion circuit CNV2 authorized by the flip-flop L2. The signal which makes the flip-flop L0 switch is preferably the combination of a clock signal CLK at logic level 1 and the signal RST at level 1. An AND gate receiving these two signals makes it possible to establish this switching control of L0.

It should be noted that the software controlling the operation of the readers must be designed so as to permit this operation. Thus, in the case of a reader according to standard SLE4403 or TS1301, it is sufficient to supply an instruction "RESET", because said instruction supplies the combination RST=1, CLK=1. However, in the case of a reader according to standard TS1001, the reader must supply a programming instruction in order to obtain the combination RST=1 and CLK=1 which will switch the flip-flop L0. The software used in the readers for said protocol selection phase must therefore take account of this requirement.

However, if the protocol information stored in the first three bits of the memory is not satisfactory, it must be changed and then the following procedure will be used. It should be noted that the reading stages which have preceded are not absolutely necessary, because it would be possible to write a protocol information in the memory without previously reading that already entered there.

It will be necessary to erase the first three bits from the memory, so as to only program that corresponding to the selected protocol. For this purpose the erased instruction and then the programming instruction will be constituted by the presence of a long clock signal, e.g. exceeding approximately 1 millisecond on the terminal CLK, the terminal RST remaining at 0. The presence of a long clock signal will be interpreted as an erase instruction. The presence of two successive long clock signals, i.e. not separated by a reading operation (short clock signal) will be interpreted as an erase instruction, followed by a programming instruction.

Thus, it would be possible to perform the following protocol by e.g. accepting that the third bit has to be programmed: the reader is positioned on a first bit, erases it, then on the second bit, erases it, then on the third bit, erases it and programs it by means of two long clock signals not separated by a short clock signal. During this time, the signal RST remains at 0.

Following the programming of the cell corresponding to the desired protocol, e.g. the third memory cell, the flip-flop corresponding to said cell (L3) will be placed in a state authorizing the putting into service of a given conversion circuit (CNV3 in this case).

Finally, simultaneously a reinitialization signal is supplied to the terminal RST and a short clock signal to the terminal CLK, which will switch the flip-flop L0. The latter stops inhibiting the selected conversion circuit and also prevents the operation of the auxiliary circuit CNVA.

It is then possible for the reader to exchange in normal manner data with the card in accordance with its own protocol, which it has imposed on the card. The protocol number will remain recorded in the RCM for subsequent uses of the card with the same reader type and until said card is inserted in a different reader type. Thus, temporary use has been made for a protocol selection of the signals present on the terminals VCC, VPP, VSS (supply terminals), the clock terminal CLK and the terminal RST, as well as the terminal I/O for the reading operations.

In order to illustrate the significance of the conversion circuits such as CNV1, CNV2, CNV3, FIG. 2 shows the circuit portion which establishes a writing instruction WR intended for the control circuit CMD in a protocol corresponding to standard TS1301. The corresponding timing charts are also shown. The writing instruction appears during the duration of a clock signal on the terminal CLK, provided that the signal present on the terminal PROG is at state 1 at the time of the rising clock front. The instruction WR makes it possible to write or erase, as a function of the state of the input I/O.

Once again in exemplified manner, FIG. 3 shows the corresponding conversion circuit portion for the protocol SLE4403 with the corresponding timing charts. The writing instruction WR (programming or erasing, as a function of the state of I/O) appears during the time of a clock square wave pulse on the terminal CLK, provided that said pulse has been preceded by a short pulse on the terminal RST.

FIG. 4 shows the main portions of the auxiliary conversion circuit according to the invention making it possible to establish the read, write and erase signals on the basis of signals appearing on the terminal CLK and which can be produced from readers operating in accordance with any random one of the three protocols TS1001, TS1301 or SLE4403.

The simplified protocol which is used is as follows: if the clock signal is a short square wave pulse, it determines an incrementation operation on the rising front of said pulse and a reading operation on the falling front. If the clock signal is a long square wave pulse it determines a writing operation and consists of an erase operation if there is only one long square wave pulse and a programming operation if there are two successive pulses of this type.

For this purpose, the auxiliary conversion circuit can be constituted in the way shown in FIG. 4. A monostable flip-flop DT1 is connected to the terminal CLK and establishes a square wave pulse of duration t1 from the rising front of the clock CLK. An AND gate G7 receives the output of the flip-flop DT1 and the inverted output of the clock CLK. The AND gate G7 establishes a reading instruction RD only if the duration of the clock signal is shorter than t1 (reading instruction only for square wave pulses of short duration). An AND gate G8 receives the signal on CLK and the inverted output of the flip-flop DT1. It establishes a signal S1, which is a writing instruction if the clock is a shorter duration than t1.

The writing instruction S1 is transformed into an erase instruction ER or a programming instruction WR in the following way. A flip-flop RS B1 receives the logic compliment S1* of the signal S1 on a first input and the read signal RD on a second input. Its output S2 passes to 1 during a rising front of S1*, i.e. during a falling front of S1, i.e. at the end of a long square wave clock pulse and remains there for as long as it is not brought to 0 by a rising front of the read signal RD.

Said output S2 authorizes the opening of an AND gate G9, which can allow the passage of the signal S1. The logic compliment S2* of S2 authorizes the opening of an AND gate G10, which can also permit the passage of the signal S1. The output of the gate G9 can be used for forming a programming signal WR, whereas the output of the gate G10 can be used for forming an erase signal ER. The durations of these signals are substantially equal to the duration of the long square wave pulse on CLK, from which must be deducted the duration t1 of the monostable flip-flop DT1.

Operation is as follows. When the clock square wave pulses are short, the output S2 of the flip-flop RS B2 remains at zero, the gate G10 being open, but there is no signal S1 to pass through. When a long square wave pulse appears, a signal S1 is produced and passes through the still open gate G10. An erase operation is performed. At the end of the long square wave pulse on CLK, the flip-flop RS changes state and its output S2 opens the gate G9.

Two possibilities will then occur. Either a further long square wave pulse is emitted and a signal S1 is again produced, but on this occasion the signal will pass through the open gate G9, thus producing a programming operation WR. Alternatively a short square wave clock pulse is emitted (reading operation), which restores the flip-flop RS to the initial state (output S1 at zero), so that the next writing operation can only be an erase operation.

Finally, another monostable flip-flop DT2 receives the signal present on the clock terminal CLK and supplies a square wave pulse from the rising front of the clock square wave pulse. The output of said flip-flop constitutes a signal INC, which controls the incrementing of the address counter CPT. However, this signal must not appear between two successive long square wave pulses, because the erase and programming operation relate to the same bit. Not shown, supplementary logic means are used for eliminating the incrementing instructions INC for long clock signals representing a programming following an erase.

I claim:

1. A PC-card able to communicate with a card reader according to several different communication protocols comprising in the card:
several conversion circuits (CNV1, CNV2, CNV3), each of which is able to convert into instructions, performable by the card, the electrical signals received from the reader according to a given protocol, each of the different conversion circuits corresponding to a different communication protocol,
and a protocols select, on circuit (CNVA, L0, L1, L2, L3, G1 to G6), incorporating an auxiliary conversion circuit (CNVA), the latter being able to produce specific instructions performable by the card, said specific instructions being used for the selection of one of the conversion circuits and being produced from electrical signals which can be produced in all the protocols, and having between five and eight contacts, including a clock contact CLK, a data input-output contact I/O and a reset contact RST, wherein the auxiliary conversion circuit essentially uses the signals present on the contacts CLK and RST for producing protocol selection instructions.

2. A card according to claim 1, wherein the auxiliary conversion circuit supplies different instructions (WR, ER; RD) according to the duration of a square wave pulse appearing on the clock contact CLK.

3. A PC-card able to communicate with a card reader according to several different communication protocols comprising:
several conversion circuits (CNV1, CNV2, CNV3), each of which is able to convert into instructions performable by the card the electrical signals received from the reader according to a given protocol, each of the different conversion circuits corresponding to a different communication protocol,
and a protocol selection circuit (CNVA, L0, 11, L2, L3, G1 to G6), incorporating an auxiliary conversion circuit (CNVA), the latter being able to produce specific instructions performable by the card, said specific instructions being used for the selection of one of the conversion circuits and being produced from electrical signals which can be produced in all the protocols further comprising a memory (MEM) which can be controlled by reading, writing, incrementation or reinitialization instructions, wherein the memory is used for recording in a protocol selection phase an identification of the protocol to be used and wherein the recorded identification is used in a subsequent phase for the selection of one of the conversion circuits corresponding to the identified protocol.

4. A card according to claim 3, wherein the auxiliary conversion circuit is able to supply programming, erasing and incrementing instructions from the signals present on the terminals CLK and RST.

5. A card according to claim 4, wherein an erase instruction is defined by the presence of a long clock signal and a programming instruction by the presence of a second long clock signal immediately following the first and without the interposing of a short clock signal between the two of them.

* * * * *